(12) United States Patent
Tian et al.

(10) Patent No.: US 10,780,683 B2
(45) Date of Patent: Sep. 22, 2020

(54) MODIFIED POLYESTER SHEET HAVING SNAPABILITY

(71) Applicant: Bemis Company, Inc., Neenah, WI (US)

(72) Inventors: Zheng Tian, Neenah, WI (US); Ross K. Gruetzmacher, Neenah, WI (US); Sam E. Wuest, Oshkosh, WI (US)

(73) Assignee: Bemis Company, Inc., Neenah, WI (US)

( * ) Notice: Subject to any disclaimer, the term of this patent is extended or adjusted under 35 U.S.C. 154(b) by 121 days.

(21) Appl. No.: 15/569,567

(22) PCT Filed: Jun. 12, 2015

(86) PCT No.: PCT/US2015/035465
§ 371 (c)(1),
(2) Date: Oct. 26, 2017

(87) PCT Pub. No.: WO2016/200396
PCT Pub. Date: Dec. 15, 2016

(65) Prior Publication Data
US 2018/0311945 A1 Nov. 1, 2018

(51) Int. Cl.
| | |
|---|---|
| B32B 27/36 | (2006.01) |
| C08L 67/02 | (2006.01) |
| B32B 7/12 | (2006.01) |
| B32B 27/08 | (2006.01) |
| B32B 27/20 | (2006.01) |
| B32B 27/30 | (2006.01) |
| C08L 23/08 | (2006.01) |
| B32B 27/32 | (2006.01) |
| B65D 1/02 | (2006.01) |
| C08K 3/013 | (2018.01) |
| B65D 65/40 | (2006.01) |

(52) U.S. Cl.
CPC ............ *B32B 27/36* (2013.01); *B32B 7/12* (2013.01); *B32B 27/08* (2013.01); *B32B 27/20* (2013.01); *B32B 27/306* (2013.01); *B32B 27/308* (2013.01); *B32B 27/32* (2013.01); *B65D 1/0207* (2013.01); *B65D 65/40* (2013.01); *C08K 3/013* (2018.01); *C08L 23/0869* (2013.01); *C08L 67/02* (2013.01); *B32B 2250/24* (2013.01); *B32B 2264/102* (2013.01); *B32B 2264/104* (2013.01); *B32B 2270/00* (2013.01); *B32B 2307/308* (2013.01); *B32B 2307/31* (2013.01); *B32B 2307/558* (2013.01); *B32B 2307/582* (2013.01); *B32B 2307/5825* (2013.01); *B32B 2307/702* (2013.01); *B32B 2307/7244* (2013.01); *B32B 2307/732* (2013.01); *B32B 2307/734* (2013.01); *B32B 2307/738* (2013.01); *B32B 2439/70* (2013.01); *B32B 2439/80* (2013.01)

(58) Field of Classification Search
CPC ..... C08L 67/02; C08L 23/0869; C08K 3/013; B32B 2250/24; B32B 2264/102; B32B 2264/104; B32B 2270/00; B32B 2307/308; B32B 2307/31; B32B 2307/558; B32B 2307/582; B32B 2307/5825; B32B 2307/702; B32B 2307/7244; B32B 2307/732; B32B 2307/734; B32B 2307/738; B32B 2439/70; B32B 2439/80; B32B 27/08; B32B 27/20; B32B 27/306; B32B 27/308; B32B 27/32; B32B 27/36; B32B 7/12; B65D 1/0207; B65D 65/40
See application file for complete search history.

(56) References Cited

U.S. PATENT DOCUMENTS

| | | |
|---|---|---|
| 3,960,807 A | 6/1976 | McTaggart |
| 4,463,121 A | 7/1984 | Gartland et al. |
| 5,449,722 A | 9/1995 | Nishida et al. |

(Continued)

FOREIGN PATENT DOCUMENTS

| | | |
|---|---|---|
| AU | 201305397 A1 | 11/2013 |
| EP | 2599822 A2 | 6/2013 |

(Continued)

*Primary Examiner* — Lawrence D Ferguson

(57) ABSTRACT

The present invention is directed to a fracturable thermoformable packaging sheet comprising at least one thermoplastic layer having a thickness of between 10 mil and 50 mil which is composed of a polymer matrix of between 35% (wt.) to 77.5% (wt.) relative to the total weight of the thermoplastic layer of a substantially amorphous aromatic polyester. Incorporated into this polymer matrix of the at least one thermoplastic layer is an inorganic filler which is present in an amount of between 22% (wt.) to 50% (wt.) relative to the total weight of the thermoplastic layer. The inorganic filler is encased in a carrier resin which is present in an amount of between 0.5% (wt.) to 15% (wt.) relative to the total weight of the thermoplastic layer. The fracturable thermoformable packaging sheet of the present invention may be used to form thermoformed packages having a single product cavity with a snap-open tab or covering and multipack type packages having multiple single-serve product cavities where each individual cavities can be easily separated from each other by simply breaking the flange connecting two or more cavities. Each of these packages may optionally include a partial cut and/or crease Sine extending across a portion of the package to facilitate the snapping apart of the two sections of the package.

18 Claims, 1 Drawing Sheet

(56) References Cited

U.S. PATENT DOCUMENTS

| | | |
|---|---|---|
| 5,510,398 A | 4/1996 | Clark et al. |
| 5,571,866 A | 11/1996 | Nishida et al. |
| 6,097,427 A | 8/2000 | Dey et al. |
| 6,676,852 B2 | 1/2004 | Brown et al. |
| 8,409,697 B2 | 4/2013 | Ramli et al. |
| 8,485,360 B2 | 7/2013 | Teys et al. |
| 8,511,500 B2 | 8/2013 | Teys et al. |
| 8,523,016 B2 | 9/2013 | Teys |
| 8,574,694 B2 | 11/2013 | Neill et al. |
| 8,604,123 B1 | 12/2013 | Weismann et al. |
| 2003/0162897 A1* | 8/2003 | Masuda ............ C08K 5/16 525/88 |
| 2005/0112247 A1 | 5/2005 | Stalberg et al. |
| 2009/0005514 A1 | 1/2009 | Uradnisheck et al. |
| 2011/0104342 A1 | 5/2011 | Glaser et al. |
| 2012/0107542 A1 | 5/2012 | Nelson et al. |
| 2012/0175555 A1* | 7/2012 | Menozzi ............ A23L 3/3436 252/188.28 |
| 2015/0101741 A1 | 4/2015 | Glaser et al. |

FOREIGN PATENT DOCUMENTS

| | | |
|---|---|---|
| EP | 273820 A1 | 6/2014 |
| WO | 2005070996 A1 | 8/2005 |
| WO | 2014186816 A1 | 11/2014 |

\* cited by examiner

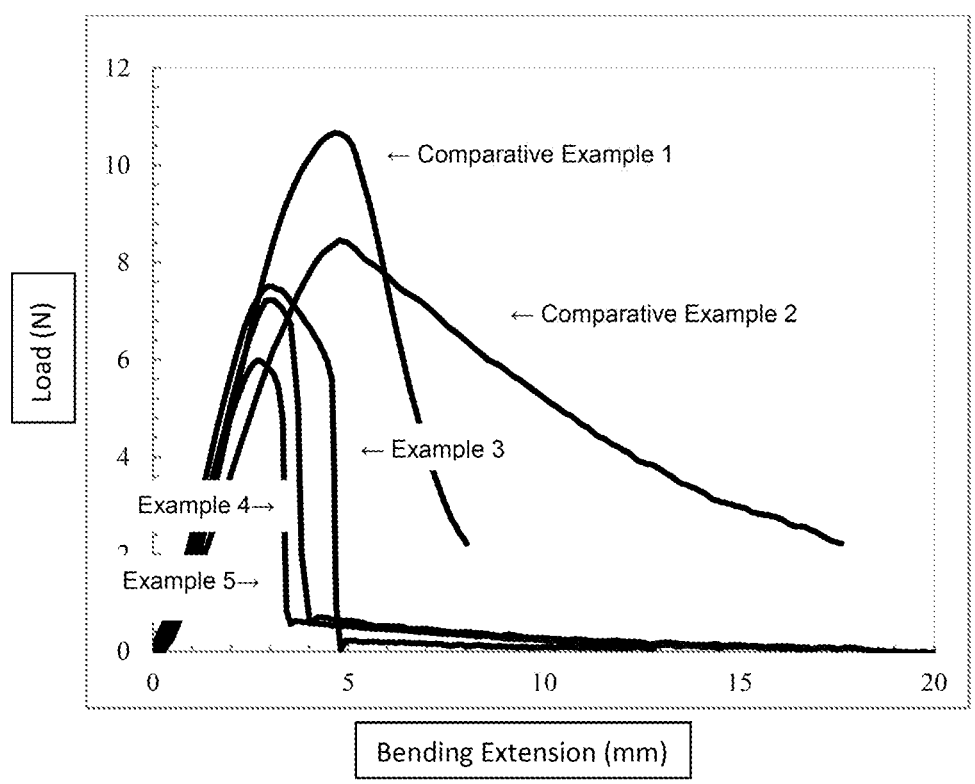

MODIFIED POLYESTER SHEET HAVING SNAPABILITY

BACKGROUND OF THE INVENTION

The present invention relates generally to primary packaging and more particularly, to thermoformable packaging sheets which may be molded into various rigid or semi-rigid container shapes.

Packaging sheets are used for many purposes. One of these many purposes includes thermoforming the sheet into articles, such as trays, cups, etc., which may then be used to package food, medical and industrial products. Use of single serve plastic containers is well known in the food product industry. These single serve containers are sometimes manufactured and sold in a multiple portion packaging tray comprising an array of separable containers. The containers are generally connected to one another along their flanges and may be broken apart by breaking the connection at the flanges. These containers work well when made of a relatively brittle plastic. Use of less brittle or more pliable polymers makes the containers more difficult to break apart. For some foods, brittle plastics, such as polystyrene, cannot provide the necessary protection and a high moisture and/or oxygen barrier polymer is needed.

One high moisture barrier packaging sheet that is currently used for thermoforming into packaging articles comprises a fully coextruded sheet with polyvinylidene chloride (PVdC) sandwiched between high impact polystyrene (HIPS), with ethylene vinyl acetate copolymer (EVA) used to laminate the central PVdC layer to the outer HIPS layers. This PVdC sheet generally has no significant sticking, forming, cutting, filling or sealing issues when used for thermoforming into articles. However, it is well known that PVdC has many environmental health concerns, with chlorine as the source of many of these concerns. Both the manufacture and the disposal of PVdC produce dioxin, a highly carcinogenic chemical; and many localities do not permit a converter or packager to reprocess or landfill-dispose of packaging materials containing PVdC.

Another high moisture and oxygen barrier thermoformable packaging sheet that is currently used comprises a fully coextruded sheet with ethylene vinyl alcohol copolymer (EVOH) sandwiched between HIPS, with high density polyethylene (HDPE) between the central EVOH layer and the outer HIPS layers as described in U.S. Pat. No. 5,972,447. Such a sheet may have a layer structure of HIPS/HDPE/EVOH/HDPE/HIPS or HIPS/tie/HDPE/tie/EVOH/tie/HDPE/tie/HIPS (where "/" is used to indicate the layer boundary). However, both structures are known to have significant forming and cutting issues when used for thermoformed articles and styrene-containing materials present challenging recycling concerns.

What is needed is an environmental-friendly thermoformable sheet which is relatively brittle to provide a snap-apart package which allows a first section of the packaging to be readily snapped away from the second section of the packaging. Accordingly, a solution to this long-felt but hitherto unresolved problem is desired which is simple and economical yet reliable, and durable.

SUMMARY OF THE INVENTION

The present invention is directed to a fracturable thermoformable packaging sheet comprising at least one thermoplastic layer having a thickness of between 10 mil and 50 mil which is composed of a polymer matrix of between 35% (wt.) and 77.5% (wt.) relative to the total weight of the thermoplastic layer of a substantially amorphous aromatic polyester. Incorporated into this polymer matrix of the at least one thermoplastic layer is an inorganic filler which is present in an amount of between 22% (wt.) and 50% (wt.) relative to the total weight of the thermoplastic layer. The inorganic filler is encased in a carrier resin which is present in an amount of between 0.5% (wt.) and 15% (wt.) relative to the total weight of the thermoplastic layer. The fracturable thermoformable packaging sheet of the present invention may be used to form thermoformed packages having a single product cavity with a snap-open tab or covering and multipack type packages having multiple single-serve product cavities where each individual cavities can be easily separated from each other by simply breaking the flange connecting two or more cavities. Each of these packages may optionally include a partial cut and/or crease line extending across a portion of the package to facilitate the snapping apart of the two sections of the package.

It should be understood that the present invention may include any number of additional layers depending upon the packaging requirements for a particular product. For example, the present invention may include only one thermoplastic layer having a polymer matrix composed of a substantially amorphous aromatic polyester, inorganic filler and carrier resin surrounding the inorganic filler. Alternatively, the present invention may include the thermoplastic layer having a polymer matrix composed of a substantially amorphous aromatic polyester, inorganic filler, and carrier resin, and a multilayer film adhesively laminated to the amorphous aromatic polyester thermoplastic layer. The multilayer film may in include any number of layers having any layer composition arranged in any sequence as desired. In a preferred embodiment, the present invention includes the amorphous aromatic polyester thermoplastic layer adhesively laminated to a sealant layer comprising a heat sealable material. Heat sealable material include, but are not limited to polyethylene such as low density polyethylene, ultra-low density polyethylene, linear low density polyethylene, ethylene alpha-olefin copolymers, ethylene vinyl acetate, ionomer or blends thereof. In another preferred embodiment, the present invention includes the amorphous aromatic polyester thermoplastic layer adhesively laminated to multilayer oxygen barrier sealant film having an oxygen barrier layer comprising ethylene vinyl alcohol copolymer and a sealant layer. In still another preferred embodiment, the sheet may be adhesively attached to the first surface and the opposing second surface of a multilayer barrier film to serve as rigid components in the following packaging laminate structure: first rigid component//multilayer barrier film//second rigid component. This type of packaging laminate structure is described more completely in U.S. application Ser. No. 12/611,880, filed Nov. 3, 2009, entitled "Chlorine-Free Packaging Sheet With Tear-Resistance Properties", Ser. No. 13/100,250, filed May 3, 2011, entitled "High Density Polyethylene Blends", and U.S. Pat. No. 8,574,694 issued on Nov. 5, 2013, entitled "Packaging Sheet With Improved Cutting Properties."

In one preferred embodiment, the sheet of the present invention is non-oriented.

In another embodiment, the sheet of the present invention is thermoformed.

In one important aspect of the present invention, the sheet of the present invention is formed from a polymer matrix composed of a substantially amorphous aromatic polyester which may be any amorphous aromatic polyester known in the art. Non-limiting examples of suitable polymer matrix materials include substantially amorphous polyethylene terephthalate, polyethylene isophthalate, glycol-modified polyethylene terephthalate, polybutylene terephthalate, polyethylene naphthalate, a blend of amorphous polyethylene terephthalate and crystalline polyethylene terephthalate, a blend of amorphous polyethylene terephthalate and glycol-modified polyethylene terephthalate or blends thereof. It is also within the scope of the present invention that post-recycled amorphous polyethylene terephthalate also known as "RPET" can be used as a suitable amorphous aromatic polyester. In one preferred embodiment, the amorphous aromatic polyester is substantially amorphous polyethylene terephthalate, polybutylene terephthalate or polyethylene naphthalate. Those skilled in the art will recognize that some crystalline aromatic polyesters can be made substantially amorphous by rapidly cooling the molten crystalline polymer below its $T_g$ or glass transition temperature.

Another important aspect of the present invention is inclusion of an inorganic filler in the polymer matrix such that the resulting sheet has enough brittleness to allow two sections of the sheet to cleanly break in a snap-like manner. This breaking or snapping of the filled matrix can be measured as its "Peak Snapping Energy" or the total energy (in Joules) at maximum force to break the sheet into two separate sections. A more detailed description of this test is provided below. The inventors have discovered that for optimal snapping performance, a peak snapping energy at a rate of 5 in/min of less than 1 mJ/mil, preferably, less than 0.7 mJ/mil, less than 0.6 mJ/mil, and more preferably, between 0.2 mJ/mil and 0.5 mJ/mil is highly desirable. This result can be achieved by blending between 22% (wt.) to 50% (wt.) relative to the total weight of the thermoplastic layer of an inorganic filler into the polymer matrix. The inorganic filler is at least one material selected from the group consisting of talc, titanium oxide, carbon black, calcium carbonate, powdered glass, gypsum, pryophyllite silicate, magnesium carbonate, kaolin, clay, calcium sulfite, aluminum hydroxide, barium sulfate and magnesium oxide. In one preferred embodiment, the inorganic filler is calcium carbonate, silica, talc, or titanium dioxide. In a more preferred embodiment, the inorganic filler is calcium carbonate. The inventors has also discovered that the particle size of the inorganic filler is important to achieving the desired snapping performance. For example, in a preferred embodiment, the inorganic filler has an average particle size of between 1 micron and 5 micron.

With the content of the inorganic filler being between 22% (wt.) to 50% (wt.), the thermoplastic layer can potentially become excessively brittle and the entire sheet may suffer a decrease in thermoformability. Since one of the objectives of the present invention is to produce a sheet material which is readily thermoformed into rigid and semi-rigid containers for food and non-food products, the sheet must be resistant to cracking or tearing during the thermoforming process and subsequent handling. In order to improve thermoformability of the filled sheet and to assist with dispersion of the inorganic filler in the polymer matrix, the polymer matrix further comprises a carrier resin to encase the inorganic filler. It has also been discovered that the carrier resin may function as an impact modifier and/or crack propagation agent for the polymer matrix. Suitable carrier resins for use in the present invention may include, but are not limited to an ethylene/methyl acrylate copolymer (EMA), an ethylene/ethyl acrylate copolymer (EEA), an ethylene/butyl acrylate copolymer (EBA), an ethylene/methyl methacrylate copolymer (EMMA), or an ethylene/glycidyl methacrylate copolymer or terpolymer (GMA), and an amorphous polyethylene terephthalate (APET). In one preferred embodiment, the carrier resin is present in an amount of between 0.5% (wt.) to 15% (wt.) relative to the total weight of the thermoplastic layer.

It is also contemplated that processing aids such as anti-oxidants, anti-static and anti-block agents, cross-linking agents may be included in the polymer matrix at concentrations typically known in the art to minimize or eliminate processing problems.

BRIEF DESCRIPTION OF THE DRAWING

FIG. 1 is Chart 1 Snapping Strength (MD) showing the snapping force in the machine direction (MD) as a function of bending extension for various Comparative Examples and Examples of the present invention.

DETAILED DESCRIPTION OF THE INVENTION

As used throughout this application, the term "sheet" refers to a plastic web having a thickness of at least about 10 mil. The term "film" means a plastic web of any thickness and is not limited to a plastic web having a thickness of less than about 10 mil. In one preferred embodiment, the sheet of the present invention has a thickness of between 10 mil and 50 mil. In another preferred embodiment, the sheet of the present invention has a thickness of between 15 mil and 45 mil.

As used throughout this application, the terms "thermoformable" and "thermoformed" refer to monolayer or multilayer thermoplastic polymer sheets, films or webs having sufficient rigidity or stiffness to be formed into a desired shape by the application of a differential pressure between the film or sheet and a mold, by the application of heat, by the combination of heat and the application of a differential pressure between the film or sheet and a mold, or by any thermoforming technique known to those skilled in the art. For purposes of this application, the term "thermoformable" also refers to non-oriented monolayer or multilayer thermoplastic polymer sheets, films or webs having a thickness of at least 10 mil.

As used throughout this application, the term "aromatic polyester" refers to any polyester having at least one phenyl (or benzene) moiety within one or both monomer repeating units used to form the material. Specific non-limiting examples of aromatic polyesters include a homopolymer or copolymer of alkyl-aromatic esters including but not limited to polyethylene terephthalate (PET), amorphous polyethylene terephthalate (APET), glycol-modified polyethylene terephthalate (PETG), polyethylene naphthalate (PEN) and polybutylene terephthalate (PBT); polyethylene isophthalate (PEI), polycycloterephthalate (PCT), polytriethylene terephthalate (PTT), a copolymer of terephthalate and isophthalate including but not limited to polyethylene terephthalate/isophthalate copolymer; and blends of any of these materials. A non-limiting example of APET is Eastman™ PET 9921, which is available from Eastman Chemical Company (Kingsport, Tenn., USA). A non-limiting example of PETG is Eastar™ Copolyester 6763, which is also available from Eastman Chemical Company (Kingsport, Tenn., USA). A non-limiting example of APET include ParaStar™ 2400 and PET 9921 polyethylene terephthalate both available from Eastman Chemical Company (Kingsport, Tenn., USA); Performance™ PET 1708 available from StarPet, Inc. (Asheboro, N.C., USA); and CLEARTUF® 8006 polyester resin available from Gruppo Mossi & Ghisolfi (Wilmington, N.C., USA). Exemplary of another suitable amorphous polyethylene terephthalate (APET) includes, but are not limited to DAK Laser+® C9921 (F65A) supplied by DAK Americas (Chadds Ford, Pa., USA).

SHEET EXAMPLES

Examples 1-6 are monolayer packaging sheets exemplifying the present invention. Each of these sheets is produced, generally, by flat die or slot cast extrusion and are shown in TABLE 1. Also shown in TABLE 1 are Comparative Examples 1-8 which are monolayer sheets. These Comparative Examples were produced in a similar manner as Examples 1-6 of the present invention. All percentages of filler and carrier resin are based relative to the total weight of the monolayer sheet.

TABLE 1

Sample Formulations

| Sample | Polymer Matrix | Filler-Amount (wt. %) | Filler Size (micron) | Carrier Resin-Amount (wt. %) | Thickness (mil) |
|---|---|---|---|---|---|
| Example 1 | APET[1] | CaCO3-22.5 | 1 | EMA[2]-5.63 | 30 |
| Example 2 | APET[1] | CaCO3-25 | 1 | EMA[2]-6.25 | 30 |
| Example 3 | APET[1] | CaCO3-27.5 | 1 | EMA[2]-6.75 | 30 |
| Example 4 | APET[1] | CaCO3-30 | 1 | EMA[2]-7.5 | 30 |
| Example 5 | APET[1] | CaCO3-40 | 1 | EMA[2]-10 | 30 |
| Example 6 | APET[1] | CaCO3-50 | 1 | EMA[2]-12.5 | 25 |
| Comparative Example 1 | HIPS[3] | — | — | — | 30 |
| Comparative Example 2 | APET[1] | — | — | — | 30 |
| Comparative Example 3 | APET[1] | CaCO3-10 | 1 | EMA[2]-2.5 | 25 |
| Comparative Example 4 | APET[1] | CaCO3-20 | 1 | EMA[2]-5.0 | 30 |
| Comparative Example 5 | APET[1] | — | — | ULDPE[3]-5.0 | 43 |
| Comparative Example 6 | APET[1] | CaCO3-20 | 3 | — | 43 |
| Comparative Example 7 | APET[1] | CaCO3-20 | 3 | LDPE[4]-5.0 | 43 |
| Comparative Example 8 | APET[1] | CaCO3-20 | 3 | EMA[2]-5.0 | 43 |

APET[1] was an amorphous polyethylene terephthalate (APET) sold under the trademark M&G CLEARTUF ® 8006C and supplied by Gruppo Mossi & Ghisolfi (Wilmington, N.C.)
Blends of CaCO3 and EMA[2] were supplied by Heritage Plastics, Inc. (Picayune, MS, USA),
HIPS[3] was a high impact polystyrene sold under the trademark Total ™ E825 and supplied by Total Petrochemicals & Refining USA, Inc. (Houston, TX, USA).
LDPE[4] was a low-density polyethylene sold under the trade name EC474 from Westlake Chemical Corporation (Houston, TX, USA), The mechanical properties of various samples were measured and the results reported in TABLE 2. The Thermos Size Stability test were conducted by placing a 100 mm×100 mm sheets of each sample into an oven heated to 125° C. for 25 minutes. The relative change in dimensions were then measured and percentage change recorded. The Puncture Resistance test was a slow puncture resistant measurement using a 2 mm and 0.125 in probes. Slow puncture resistance, Grave and Trouser Tear tests were measured using an Instron (Norwood, Mass., USA) BlueHill® testing system. All measurements represent numerical average values and were obtained in the machine direction (MD) and transverse direction (TD) where applicable.

TABLE 2

Mechanical Properties

| Sample | Thermo Size Stability | | Grave Tear (lb-f) | | Trouser Tear (g-f) | | Puncture (lb-f) | |
|---|---|---|---|---|---|---|---|---|
| | MD | TD | MD | TD | MD | TD | 2 mm | 0.125 in |
| Example 1 | — | — | 48.2 | 48.1 | 8072 | 8174 | — | — |
| Example 2 | — | — | 45.7 | 45.9 | 7765 | 7843 | — | — |
| Example 3 | — | — | 42.5 | 43.1 | 7607 | 7579 | — | — |
| Example 4 | −1% | −1% | 40.6 | 40.2 | 7204 | 7376 | 32.7 | 48.7 |
| Example 5 | +1% | +1% | 22.5 | 21.7 | 1615 | 1414 | 30.4 | 47.5 |
| Example 6 | — | — | 10.2 | 9.1 | * | * | — | — |
| Comparative Example 1 | −7% | +3% | 37.1 | 42.4 | 1307 | 1585 | 31.1 | 42.8 |
| Comparative Example 2 | −3% | −2% | 66.1 | 69.2 | 10022 | 11920 | 50.0 | 69.4 |
| Comparative Example 5 | −1% | −1% | 83.6 | 98.7 | * | * | 44.3 | 71.9 |
| Comparative Example 6 | −1% | −1% | 66.8 | 75.4 | * | * | 31.9 | 45.4 |
| Comparative Example 7 | −2% | −2% | 58.4 | 66.5 | * | * | 35.9 | 51.2 |
| Comparative Example 8 | 0% | +1% | 49.9 | 49.1 | 7040 | 8532 | 34.6 | 52.4 |

* Sheets were too brittle to make tear measurements.

In a preferred embodiment, the sheet of the present invention has a thermal dimensional stability at 125° C. for 25 min of ±2% or less in either the machine direction or transverse direction, a Graves Tear value of between 9.1 lb-f and 48.2 lb-f in either the machine direction or transverse direction, and a Trouser Tear value of between 1414 g-f and 8174 g-f in either the machine direction or transverse direction.

The breaking or snapping of the sheets of the present invention and comparative examples were measured as its "Peak Snapping Energy" or the total energy (in Joules) at maximum force to break the sheet into two separate sections. Test specimens were fabricated having the dimensions of 1 in width×5 in length having an inverted triangular shaped score-line or groove cut across the width of each specimen at one inch from the end of the specimen to a depth of 10 mil and a width of 10 mil. The specimen was then mounted to a test fixture such that the score-line was aligned with the end of the fixture leaving about one inch of the specimen exposed. A steel probe was then lowered onto the specimen approximately 0.75 in from the score-line or end of the fixture at various rates of between 1, 5, 10 and 20 inch/min to test the snapping resistance. The compression force and energy consumption were recorded and calculated, respectively. The snapping energy is the integrated area under the force/bending extension curve starting from zero to the peak extension value (a maximum load). The snapping energy is considered to represent the snapability of each sheet. The amount of force in milli-Joules (mJ) required to snap a 30 mil thick specimen at a particular rate are reported below in TABLE 3. TABLE 4 represents the snapping energy of several specimens having a thickness of 30 mil measured at a rate of 5 in/min and normalized by its thickness.

TABLE 3

Snapping Force (mJ)

| | Snapping Speed | | | |
|---|---|---|---|---|
| Sample | 1 inch/min | 5 inch/min | 10 inch/min | 20 inch/min |
| Comparative Example 1 | 26.19 | 26.58 | 31.53 | 27.39 |
| Comparative Example 2 | 18.05 | 21.31 | 20.90 | 18.59 |

TABLE 3-continued

Snapping Force (mJ)

| Sample | Snapping Speed | | | |
|---|---|---|---|---|
| | 1 inch/min | 5 inch/min | 10 inch/min | 20 inch/min |
| Comparative Example 4 | 15.43 | 16.21 | 17.03 | 16.67 |
| Example 4 | 9.96 | 11.78 | 12.37 | 13.12 |
| Example 5 | 5.32 | 8.04 | 9.34 | 8.53 |
| Example 6 | 5.17 | 7.36 | 7.76 | 8.12 |

TABLE 4

Snapping Force in Machine Direction (mJ/mil)

| Comparative Example 1 | 0.89 |
|---|---|
| Comparative Example 2 | 0.71 |
| Comparative Example 4 | 0.54 |
| Example 1 | 0.50 |
| Example 2 | 0.47 |
| Example 3 | 0.43 |
| Example 4 | 0.37 |
| Example 5 | 0.27 |

Another desirable parameter which may be used to identify optimal snapping performance of suitable blends of materials is the shape of the curve generated when measuring the snapping strength verses bending extension. In the Chart 1 shown in FIG. 1, there is shown the snapping force in the machine direction (MD) as a function of bending extension for various Comparative Examples and Examples of the present invention. The inventors have discovered that when sheet compositions exhibit a relatively steep descending curve as in the case of Examples 3, 4 and 5 compared to a more gradual descent as shown for Comparative Examples 1 and 2, the material snaps cleanly apart leaving no webbing or strands of material within the fracture line.

The above description and examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and are deemed to be within the spirit and scope of the present invention.

What is claimed:

1. A fracturable thermoformable packaging sheet comprising:
   at least one thermoplastic layer having a thickness of between 10 mil and 50 mil and comprising a polymer matrix formed from an amorphous aromatic polyester which is present in an amount of between 35% (wt.) to 77.5% (wt.) relative to the total weight of the thermoplastic layer;
   an inorganic filler incorporated into the polymer matrix which is present in an amount of between 22% (wt.) to 50% (wt.) relative to the total weight of the thermoplastic layer; and
   a carrier resin encasing the inorganic filler which is present in an amount of between 0.5% (wt.) to 15% (wt.) relative to the total weight of the thermoplastic layer, wherein the carrier resin comprises ethylene/methyl acrylate copolymer (EMA).

2. A sheet according to claim 1, wherein the sheet has a peak snapping energy at a rate of 5 in/min of between 0.27 mJ/mil and 0.50 mJ/mil.

3. A sheet according to claim 1, wherein the amorphous aromatic polyester is polyethylene terephthalate, glycol-modified polyethylene terephthalate, polybutylene terephthalate, polyethylene isophthalate or polyethylene naphthalate.

4. A sheet according to claim 1, wherein the amorphous aromatic polyester is polyethylene terephthalate.

5. A sheet according to claim 1, wherein the inorganic filler has an average particle size of between 1 micron and 5 micron.

6. A sheet according to claim 1, wherein the inorganic filler is calcium carbonate, silica, talc, titanium dioxide, barium sulfate or magnesium oxide.

7. A sheet according to claim 6, wherein the inorganic filler is calcium carbonate.

8. A sheet according to claim 1, wherein the inorganic filler is present in an amount of between 30% (wt.) and 50% (wt.) relative to the total weight of the thermoplastic layer.

9. A sheet according to claim 1, wherein the thermoplastic layer has a thickness of between 15 mil and 45 mil.

10. A sheet according to claim 1, wherein the sheet has an impact resistance of at least 400 N.

11. A sheet according to claim 1, wherein the sheet has a thermal dimensional stability at 125° C. for 25 min of ±2% or less in either the machine direction or transverse direction.

12. A sheet according to claim 1, wherein the sheet has a Graves Tear value of between 9.1 lb-f and 48.2 lb-f in either the machine direction or transverse direction.

13. A sheet according to claim 1, wherein the sheet has a Trouser Tear value of between 1414 g-f and 8174 g-f in either the machine direction or transverse direction.

14. A sheet according to claim 1, wherein the sheet is non-oriented.

15. A sheet according to claim 1, wherein the sheet is thermoformed.

16. A sheet according to claim 1, wherein the sheet is adhesively laminated to a sealant layer comprising a heat sealable material.

17. A sheet according to claim 1, wherein the sheet is adhesively laminated to a multilayer oxygen barrier sealant film having an oxygen barrier layer comprising ethylene vinyl alcohol copolymer and a sealant layer.

18. A sheet according to claim 1, wherein the sheet is adhesively attached to the first surface and the opposing second surface of a multilayer barrier film to serve as rigid components in a packaging laminate.

* * * * *